United States Patent [19]
Asquith

[11] 3,939,727
[45] Feb. 24, 1976

[54] MECHANICAL ACTUATING SYSTEM
[75] Inventor: Anthony Asquith, Nuneaton, England
[73] Assignee: Girling Limited, Birmingham, England
[22] Filed: Sept. 17, 1974
[21] Appl. No.: 506,857

[30] Foreign Application Priority Data
Sept. 18, 1973 United Kingdom............... 43655/73

[52] U.S. Cl. ................................................ 74/516
[51] Int. Cl.² ........................................ G05G 1/04
[58] Field of Search .............. 74/516, 517, 523, 519

[56] References Cited
UNITED STATES PATENTS
3,216,276   11/1965   Nagy.................................... 74/516

Primary Examiner—Samuel Scott
Assistant Examiner—Frank H. McKenzie, Jr.
Attorney, Agent, or Firm—Scrivener Parker Scrivener and Clarke

[57] ABSTRACT

In a mechanical actuator system a primary lever is angularly movable about a first pivot on a secondary lever through a first range to apply a force to an actuated member, and the actuating force is then transmitted to the actuated member through a higher leverage by the secondary lever which is angularly movable about a second pivot on a fixed part. The secondary lever is coupled to the actuated member by a one-way clutch, and the first pivot comprises a connection for a pawl which is engagable with ratchet teeth on the fixed part, at least when the clutch is engaged.

14 Claims, 5 Drawing Figures

MECHANICAL ACTUATING SYSTEM

This invention relates to an improved mechanical actuator system of the kind for applying an actuating force to an actuated member or part which is moved or to which pressure is to be applied in which the actuating force is first applied directly to the actuated member or part by a primary lever movable about a first pivot or fulcrum on a secondary lever until the reaction to the actuating force attains a predetermined value whereafter the actuating force is then transmitted to the actuated member or part through a higher leverage by the secondary lever which is movable about a second pivot or fulcrum on a fixed part and which is actuated through the primary lever, the secondary lever being coupled to the actuated member or part by a one-way clutch which is engaged as the secondary lever is moved about the second pivot or fulcrum on the fixed part.

According to our invention in a mechanical actuating system of the kind set forth the first pivot or fulcrum also comprises a connection for a pawl which is engageable with the ratchet teeth on a fixed part to hold the levers in an applied position, at least when the one-way clutch is engaged.

Preferably, the pawl is normally spring urged into engagement with the ratchet teeth and the spring loading can be overcome to disengage the pawl from the teeth upon operation of a manually displaceable release member.

Conveniently the one-way clutch comprises a toggle arm which is connected to the secondary lever by a third pivot or fulcrum and which is held out of engagement with the actuated member or part by an engagement with the stationary part when the secondary lever is in an inoperative position, movement of the secondary lever about the second pivot or fulcrum carrying the toggle arm away from the stationary part to permit it to engage with the actuated member or part whereafter movement of the primary lever is transmitted to the actuated member or part through the secondary lever and the one-way clutch.

Our invention is particularly suitable for incorporation into a hand-brake applying mechanism for a vehicle in which the primary lever is movable angularly about the first pivot or fulcrum to take up the braking clearances and subsequently moves with the secondary lever to apply a brake. Thus, for a given manual force applied to the primary lever the moment increases substantially when the brake is being applied with the applying load transmitted through the secondary lever.

One embodiment of our invention is illustrated in the accompanying drawings in which.

Figure 1:
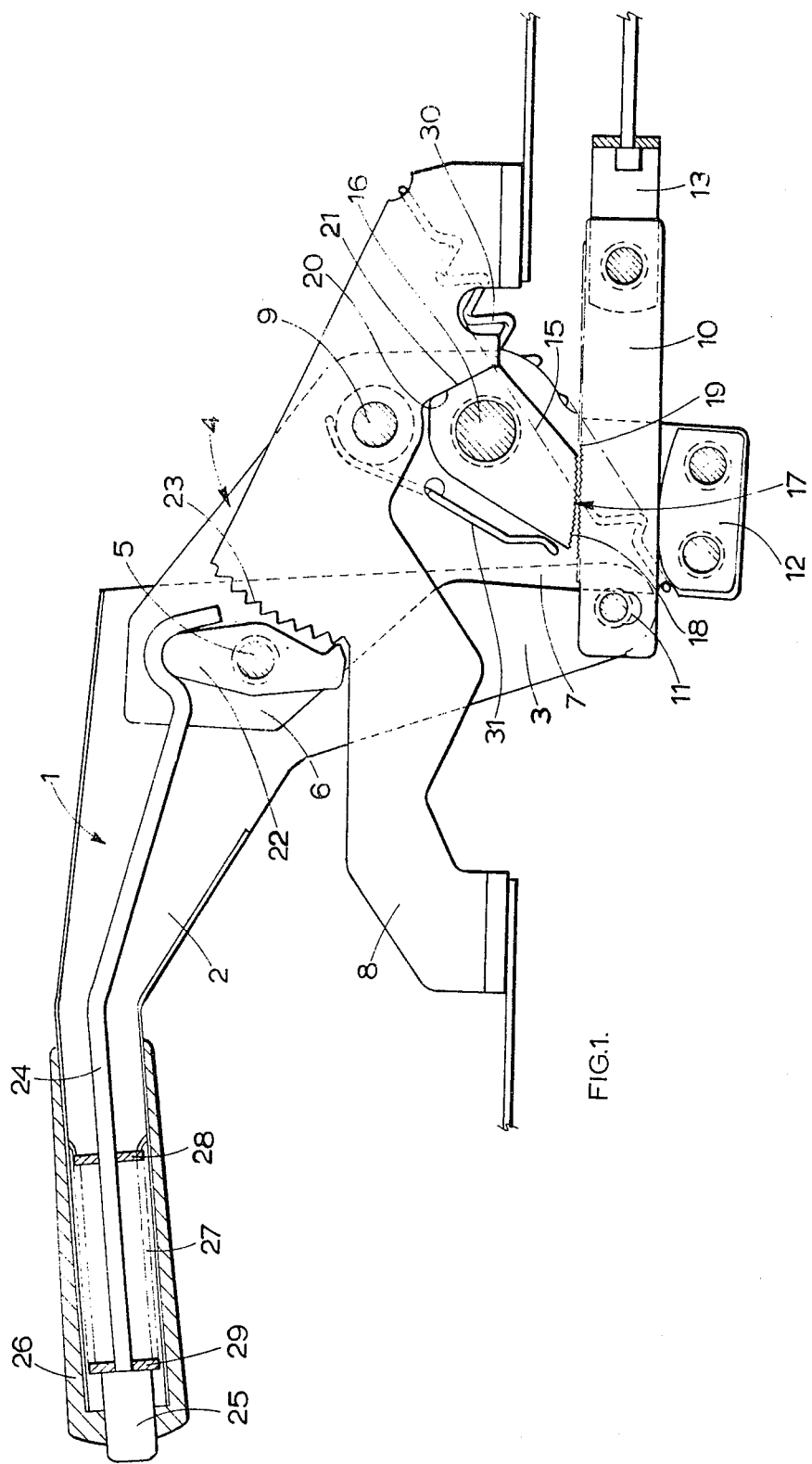
FIG. 1 is a hand-brake applying machanism for an emergency or parking brake of a vehicle with the mechanism disclosed in an inoperative position.

In the hand-brake applying mechanism illustrated in the drawings a primary lever 1, generally in the form of a bell-crank lever having arms 2 and 3, is pivotally connected at substantially the intersection of the arms 2 and 3 to a secondary lever 4 by means of a first pivot pin or fulcrum 5. The secondary lever 4 is of bifurcated dog-leg outline having a pair of arms 6 and 7 which are relatively displaced at an obtuse angle and the first pivot pin or fulcrum 5 is connected to the outer end of the arms 6 through spaced flanges which define the arm 3 and which straddle the arms 6. At substantially the intersection of the arms 6 and 7 the secondary lever 4 is pivotally connected to a stationary part 8 which it straddles by means of a second pivot pin or fulcrum 9.

The free end of the arm 3 is coupled to an actuated connecting member or part 10 of elongate outline by means of a pin 11. The outermost edge of the connecting member 10 remote from the pivot or fulcrum 9 engages slidably with a spacer 12 interposed and connected between the side flanges of the secondary lever 4. The end of the connecting member 10 remote from the pin 11 is secured by means of a fitting 13 to an inextensible member, conveniently a cable or rod, for actuating a wheel brake of a vehicle for parking or emergency purposes.

A toggle arm 15 is pivotally mounted between the flanges of the secondary lever 4 by means of a pin 16. The toggle arm 15 is provided with a tip or clutch surface 17 which is inclined with respect to the main axis of the arm 15 and which is provided with serrations or teeth 18 for engagement with complementary teeth 19 in an adjacent edge of the member 10. In the inoperative position shown in the drawings the teeth 18 and the teeth 19 are held out of mesh by the engagement of a planar abutment face 20 at the edge of the arm 15 remote from the tip 17 with a complementary stop face 21 on the fixed part 8.

A pawl 22 mounted on the first pivot pin or fulcrum 5 between the flanges of the secondary lever 4 is engageable with a plurality of arcuately disposed ratchet teeth 23 provided in an adjacent portion of the stationary part 8. An elongate inextensible member 24 is coupled at its inner end to the pawl 22. The outer end of the inextensible member 24 carries a manually-operable release button 25 of increased diameter projecting through an opening in the outer end of a handgrip 26 which encloses the outer free end of the arm 2. Normally the pawl 22 is urged in an anti-clockwise direction as seen in the drawings into engagement with the ratchet teeth 8 by means of a compression spring 27 acting between an abutment 28 fixed within the arm 2 and an abutment 29 acting on a shoulder at the step in diameter between the button 25 and the member 24.

In an inoperative position shown in FIG. 1 of the drawings the pawl 22 engages between the lowermost pair of teeth 23 and the secondary lever 4 is urged in a counterclockwise direction by a tension return spring 30 acting between the secondary lever 4 and the stationary part 8.

As illustrated in the drawings the toggle arm 15 may be urged at all times towards the member 10 by means of a torsion or blade spring 31 acting between the secondary lever 4 and the toggle arm 15. Conveniently, the end of the torsion or blade spring 31 remote from the toggle arm 15 may abut against the pivot pin or fulcrum 9.

Figure 2:
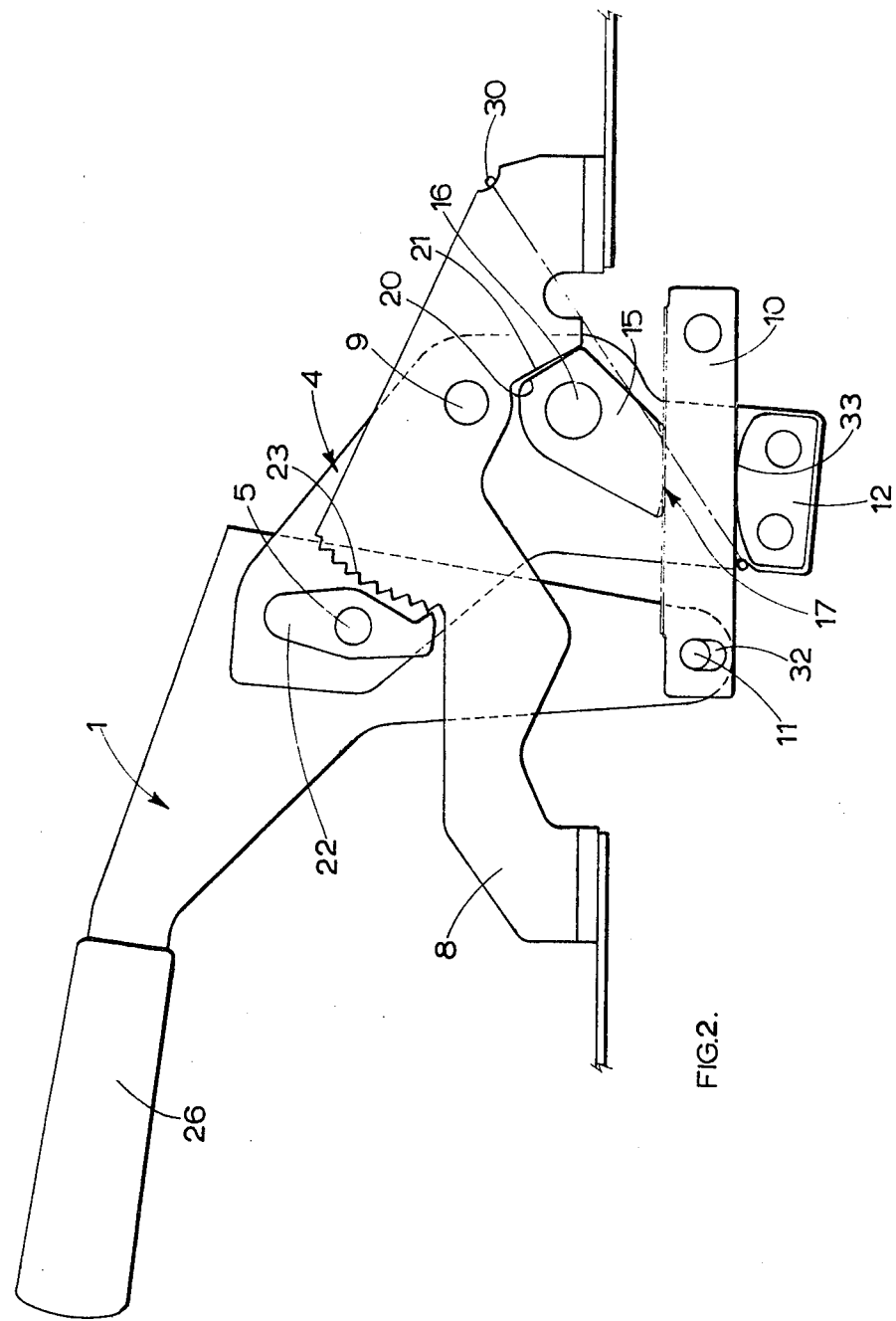
FIG. 2 is a view similar to FIG. 1 but with the mechanism in an intermediate position.
Figure 3:
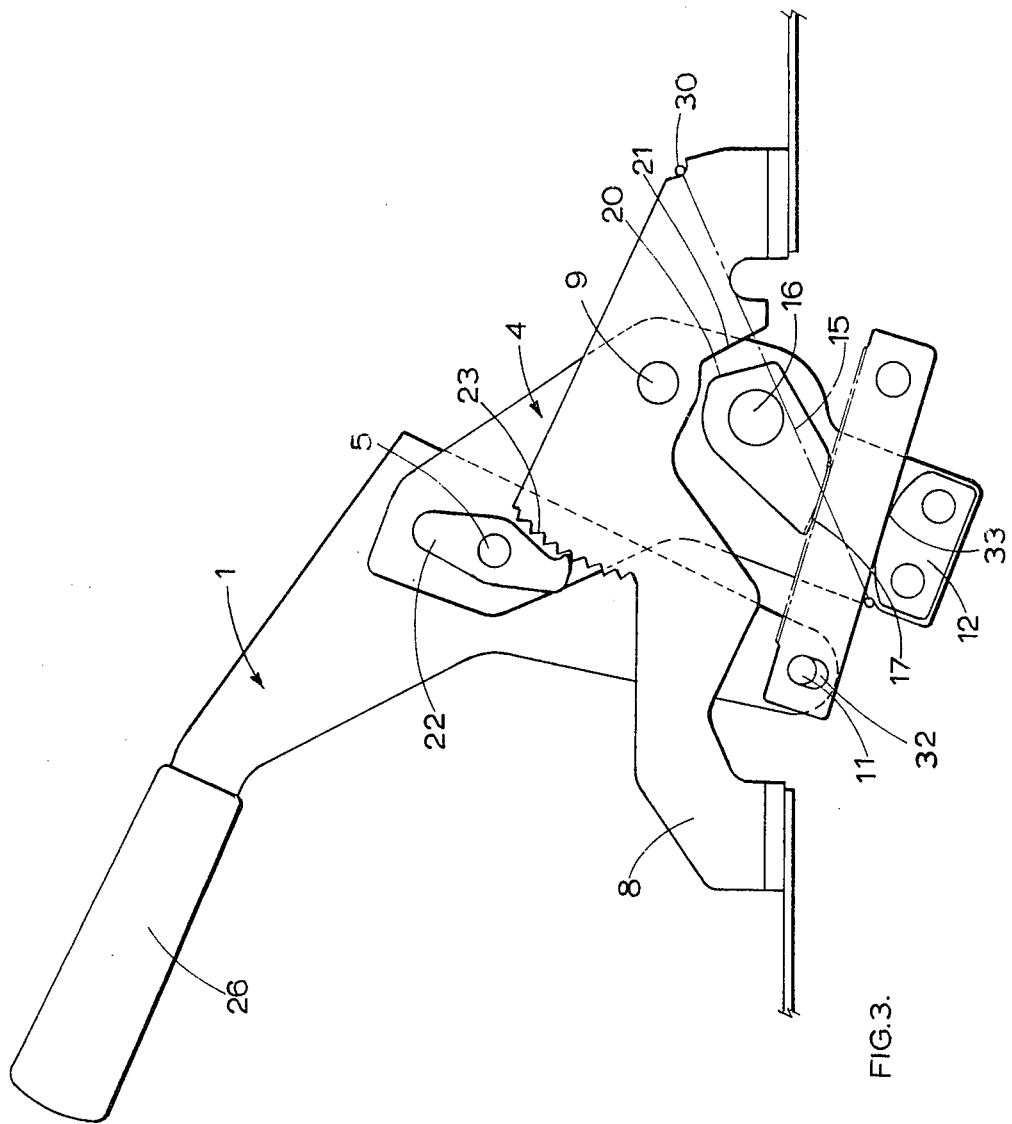
FIG. 3 shows the relative positions of the parts of the mechanism when the brake is fully applied.

In operation of the mechanism, initial angular movement of the primary lever 1 in a clockwise direction with reference to the drawings causes the lever 1 to move angularly about the first pivot or fulcrum 5 and impart a direct force to the member 10 through the pin 11 to take-up the braking clearance. During this movement, the secondary lever 4 remains stationary until such time as the resistance to further angular movement of the primary lever 1 about the first pivot pin or fulcrum 5 is sufficient to overcome the loading of the tension return spring 30. Thereafter, initial further angular movement of the primary lever 1 carries with it the secondary lever 4 which moves angularly about the second pivot pin or fulcrum 9 with respect to the stationary part 8, and in turn, moves the toggle arm 15 away from the stationary part 8 (FIG. 2). The serrations or teeth 18 on the toggle arm 15 then engage automatically with the complementary teeth or serrations 19 on the member 10 to lock together the secondary lever 4 and the member 10. Thereafter, the force causing the primary lever 1 to move angularly in the same direction is transmitted to the member 10 through the secondary lever 4 at an increased leverage, and the primary lever 1 and the secondary lever 4 move together as a single assembly. During this movement the pawl 22 rides over the ratchet teeth 23 automatically to maintain the brake in an applied position (FIG. 3) with the pawl 22 engaging with appropriate ratchet teeth 23 under the influence of the compression spring 27.

To release the brake, the button 25 is depressed to move the pawl 22 angularly about the pivot pin or fulcrum 5 and out of engagement with the ratchet teeth 28, against the force in the compression spring 27. The levers 1 and 4 can then be moved angularly together about the pivot pin or fulcrum 9 until the abutment face 20 on the toggle arm engages again with the face 21 on the stationary part 8. This moves the toggle arm 15 angularly about the pivot pin 16 against the loading of the torsion or blade spring 31 to release the one-way clutch. The primary lever 1 can then be returned to the inoperative position shown in FIG. 1 of the drawings by moving it angularly about the second pivot or fulcrum 5 with respect to the secondary lever 4.

In the embodiment described above the pin 11 extends through an opening 32 in the connecting member 10 which is of elongate outline in a radial direction, to provide a degree of lost-motion, and the inner edge of the spacer 12 is of arcuate outline as shown at 33. These features are necessary to accommodate movement of the connecting member 10 as the force is applied to it through the levers 1 and 4, to avoid straining deformation or distortion of the various parts of the mechanism and the levers 1 and 4 are moved angularly with respect to the stationary part 8.

Figure 4:
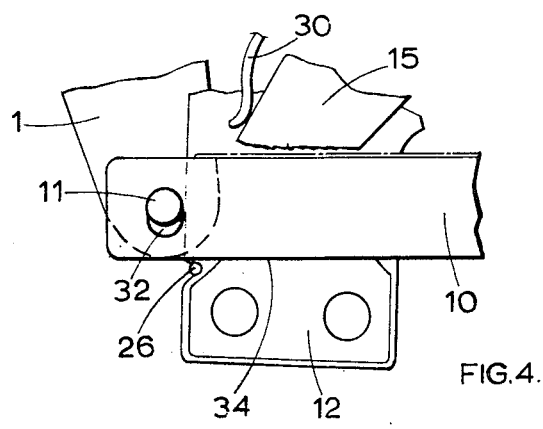
FIG. 4 is a view of a part of the mechanism showing a modified one-way clutch.

In the modified construction illustrated in FIG. 4, again the opening 32 is of elongate outline but the inner edge of the spacer 12 is planar as illustrated at 34. Relative movement between the levers 1 and 4 and the connecting member 10 will be accommodated wholly by the radial clearance between the opening 32 and the pin 11.

Figure 5:
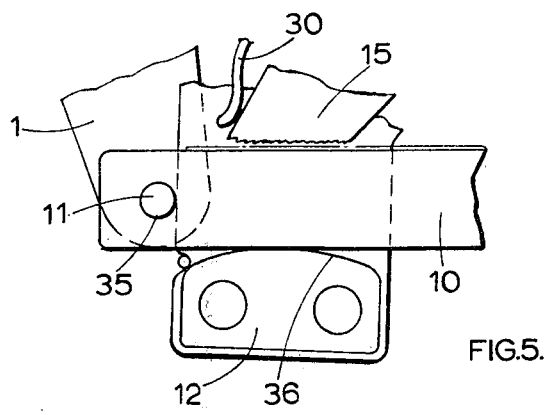
FIG. 5 is a view similar to FIG. 4 but showing a further modified one-way clutch.

In the modified construction illustrated in FIG. 5, the pin 11 is received in a close fitting circular opening 35, and the inner edge of the spacer 12 is of arcuate outline as shown at 36. In this construction the connecting member 10 will move angularly as the primary lever 1 is moved angularly about the first pivot pin or fulcrum 5, rocking and sliding on the edge 12.

In view of the foregoing it will be appreciated that the construction of the hand-brake applying mechanism will depend on the location of the cable or rod to which the connecting member is coupled, taking into account the avoidance of straining, deforming, or otherwise distorting the various parts of the mechanism in response to the force applied to the primary lever 1.

I claim:
1. A mechanical actuator system for applying an actuating force to an actuated member which is to be moved or to which pressure is to be applied comprising a primary lever, a secondary lever, a fixed part, a first pivot on said secondary lever about which said primary lever is movable by an actuating force through a first range until reaction to said actuating force attains a predetermined value, a second pivot on said fixed part about which said secondary lever is angularly movable with said primary lever through a second range into an applied position after said reaction attains said predetermined value whereby said actuating force is transmitted to said actuated member through a higher leverage, a one-way clutch for coupling said secondary lever to said actuated member through said second range, said clutch normally being disengaged but being engaged as said secondary lever is moved about said second pivot, ratchet teeth on said fixed part, and a pawl connected to said first and second levers by said first pivot and engageable with said ratchet teeth to hold said levers in said applied position at least when said clutch is engaged.

2. A mechanical actuating system as claimed in claim 1, wherein a spring is provided to urge said pawl into engagement with said ratchet teeth, and a manually displaceable release member is incorporated for disengaging said pawl from said teeth in opposition to the loading at said spring.

3. A mechanical actuating system as claimed in claim 1, wherein said one-way clutch comprises a toggle arm for engagement with said actuated member, a third pivot for connecting said toggle arm to said secondary lever, a first abutment on said toggle arm, and a second complementary abutment on said fixed part with which said first abutment engages to hold said toggle arm out of engagement with said actuated member at least during movement of said primary lever through said first range with said secondary lever in an inoperative position, movement of said secondary lever about said second pivot carrying said first abutment out of engagement with said second abutment to permit said toggle arm to engage with said actuated member whereafter movement of said primary lever is transmitted to said actuated member through said secondary lever and said one-way clutch.

4. A mechanical actuating system as claimed in claim 3, wherein the toggle arm is provided with a clutch face which is inclined with respect to the main axis of the arm and is provided with teeth for engagement with complementary teeth in an adjacent edge of the actuated member.

5. A mechanical actuating system as claimed in claim 1, including a pivotal connection by which said actuated member is coupled to said primary lever by a pivotal connection, and a guide portion on said secondary lever is engaged slidably by said actuated member.

6. A mechanical actuating system as claimed in claim 5, wherein said pivotal connection is provided with a degree of lost-motion.

7. A mechanical actuating system as claimed in claim 6, wherein said guide portion of said secondary lever is a planar outline.

8. A mechanical actuating system as claimed in claim 6, wherein said guide portion of said secondary lever is of arcuate outline.

9. A mechanical actuating system as claimed in claim 5, wherein there is no lost-motion in said pivotal connection.

10. A mechanical actuating system as claimed in claim 8, wherein said guide portion of said secondary lever is of arcuate outline.

11. A mechanical actuating system as claimed in claim 5, wherein said secondary lever is of bifurcated outline provided with spaced arms between which said actuated member is located, and said arms are interconnected by a spacer member having an inner edge disposed adjacent to said actuated member and defining said guide portion.

12. A hand-brake applying mechanism for a vehicle incorporating an actuated member for operating a brake comprising a primary lever, a secondary lever, a fixed part, a first pivot on said secondary lever about which said primary lever is movable by an actuating force through a first range to take up brake clearnaces until reaction to said actuating force attains a predetermined value, a second pivot on said fixed part about which said secondary lever is angularly movable with said primary lever through a second range into an applied position to apply the brake after said reaction attains said predetermined value whereby said actuating force is transmitted to said actuated member through a higher leverage, a one-way clutch for coupling said secondary lever to said actuated member through said second range, said clutch normally being disengaged but being engaged as said secondary lever is moved about said second pivot, ratchet teeth on said fixed part, and a pawl connected to said first and second levers by said first pivot and engageable with said ratchet teeth to hold said levers in said applied position at least when said clutch is engaged.

13. A hand-brake applying mechanism as claimed in claim 12, wherein a button for releasing said pawl is incorporated in said primary lever.

14. A hand-brake applying mechanism as claimed in claim 12, wherein a spring for urging said pawl into engagement with said ratchet teeth acts at opposite ends between spaced abutments in said primary lever, one abutment acting on said lever and the other abutment acting on a shoulder between said button and an inextensible member coupled to said pawl.

* * * * *